(12) United States Patent
Lemke et al.

(10) Patent No.: US 6,946,527 B2
(45) Date of Patent: Sep. 20, 2005

(54) MODIFIED POLYMERIC SHAPED BODY, METHOD FOR PRODUCING THE SAME AND USE THEREOF

(75) Inventors: Horst Dieter Lemke, Obernburg (DE); Arne Gehlen, Aschaffenburg (DE)

(73) Assignee: Membrana GmbH, Wuppertal (DE)

(*) Notice: Subject to any disclaimer, the term of this patent is extended or adjusted under 35 U.S.C. 154(b) by 390 days.

(21) Appl. No.: 10/333,778

(22) PCT Filed: Jul. 5, 2001

(86) PCT No.: PCT/EP01/07666
§ 371 (c)(1),
(2), (4) Date: Jan. 24, 2003

(87) PCT Pub. No.: WO02/08301
PCT Pub. Date: Jan. 31, 2002

(65) Prior Publication Data
US 2003/0171502 A1 Sep. 11, 2003

(30) Foreign Application Priority Data
Jul. 25, 2000 (DE) .......................... 100 36 082

(51) Int. Cl.⁷ ...................... A61K 31/765; B01D 39/16; B01D 39/18; C08G 68/18; C08G 75/23
(52) U.S. Cl. .............. 525/430; 210/500.37; 424/78.17; 525/536; 536/58; 604/4.01
(58) Field of Search ................ 210/500.37; 424/78.17; 525/430, 536; 536/56; 604/4.01

(56) References Cited

U.S. PATENT DOCUMENTS

| 3,950,539 A | 4/1976 | Militzer et al. ............ 124/324 |
| 4,159,898 A | 7/1979 | Cohen et al. ............... 44/63 |
| 5,128,360 A | 7/1992 | Cerami et al. ............. 514/400 |
| 5,891,341 A | 4/1999 | Li et al. .................... 210/646 |
| 5,994,577 A | 11/1999 | Larsen et al. ............. 560/168 |

FOREIGN PATENT DOCUMENTS

| DE | 100 12 332 A1 | 10/2001 |
| GB | 1020059 | 5/1963 |
| WO | WO 94/19379 | 9/1994 |

OTHER PUBLICATIONS

R. Nakazawa et al., "A New Treatment for Dialysis–related Amyloidosis With β 2–Microglobulin Adsorbent Column", *The International Journal of Artificial Organs*, vol. 16, No. 12, 1993, pp. 823–829.

P. Thornalley, "Advanced Glycation and the Development of Diabetic Complications, Unifying the Involvement of Glucose, Methylglyoxal and Oxidative Stress", *Endocrinology Metabolism*, 1996, pp. 149–166.

M. Jadoul et al., "Influence of Hemodialysis Menbrane Type on Pentosidine Plasma Level, A Marker of Carbonyl Stress", *Kidney International*, vol. 55, 1999, pp. 2487–2492.

*Primary Examiner*—Robert Sellers
(74) *Attorney, Agent, or Firm*—Oliff & Berridge, PLC

(57) ABSTRACT

AGE precursors can be removed from blood, plasma or PBS buffer using a modified polymeric shaped body that can be produced by reaction of diaminoguanidine and/or triaminoguannidine with a staring polymeric shaped body carrying R—X residues, where R is an alkylene group that may or may not be substituted with a hydroxyl group and contains from 1 to 3 carbon atom, and X is a group that is substituted during the reaction by carrying residues Y, on to with diaminoguanidine, or with a starting polymeric shaped body during the reaction which diaminoguanidine and/or triaminoguannidine are added during the reaction.

31 Claims, 6 Drawing Sheets

MODIFIED POLYMERIC SHAPED BODY, METHOD FOR PRODUCING THE SAME AND USE THEREOF

BACKGROUND OF THE INVENTION

1. Field of Invention

The invention relates to a modified polymeric shaped body, a method for producing the same and the use thereof.

2. Description of Related Art

AGEs (advanced glycation endproducts) are present in blood and blood plasma, particularly in kidney patients and diabetics. They are proteins that have lost their function as a result of modification and cross-linking with degradation products of sugars. AGEs give rise to various secondary diseases such as arteriosclerosis and amyloidosis. Much research has therefore been carried out on the removal of AGEs from blood or plasma.

Conventional methods of treating blood like high-flux or low-flux dialysis or hemodiafiltration do not bring about an appreciable reduction in AGE concentration.

Various approaches have been suggested in the prior art for removal of AGEs.

The International Journal of Artificial Organs (1993), vol 16, pp. 823–829 describes an adsorber column filled with hydrophobised cellulose spheres.

While this was successful in reducing the concentration of β2 microglobulin, and therefore also of AGE-modified β2 microglobulin, it also simultaneously removed other proteins, such as RBP, prolactin, C-PTH, HS-PTH and WBC, that should not be removed.

U.S. Pat. No. 5,891,341 describes a cysteine-bounded loop consisting of 17–18 aminoacids that is immobilised on a dialysis membrane. This allows the removal of various AGEs from the blood during dialysis. However, only those AGEs dissolved in the blood are removed; AGEs that have already been deposited are not affected by this treatment. Moreover, the handling of a protein-modified membrane of this type is considerably complicated by the fact that it cannot be sterilised. In addition, AGE formation as such is not prevented.

U.S. Pat. No. 5,128,360 discloses that compounds with active nitrogen such as aminoguanidine, α-hydrazinohistidine and lysine or mixtures thereof are agents for inhibition of AGE formation. According to U.S. Pat. No. 5,128,360, these compounds appear to react with early glycosylation products, which are then prevented from forming AGEs. The compounds are administered as drugs and therefore necessarily come into contact with tissue.

The journal Endocrinology and Metabolism (1996), vol 3, pp 149–166 discloses that aminoguanidine intercepts a-oxyaldehydes such as glyoxal, methylglyoxal and 3-deoxyglueosone, i.e., AGE precursors, thus hindering AGE formation. However, aminoguanidine in contact with tissue leads to highly undesirable side-effects in the form of NO-synthase inhibition.

SUMMARY OF THE INVENTION

The object of the present invention is therefore to provide a product and a method of producing it whereby AGE precursors can be removed from blood or plasma without undesired side-effects, and whereby the formation of AGEs can be suppressed.

This object is achieved on the one hand by means of a modified polymeric shaped body that can be produced by reacting diaminoguanidine and/or triaminoguannidine with a starting polymeric shaped body carrying R—X residues, where R is an alkylene group that may or may not be substituted with a hydroxyl group and contains from 1 to 3 carbon atoms and X is a group that is substituted during the reaction by diaminoguanidine and/or triaminoguannidine, or by means of a starting polymeric shaped body carrying residues Y, on to which dianinoguanidine and/or triaminoguannidine are added during the reaction.

In the modified polymeric shaped body of the invention, diaminoguanidine and/or triaminoguannidine are covalently bound via substitution or addition reactions to the starting polymeric shaped body, so that the modified polymeric shaped body of the invention is provided with diaminoguanidine and/or triaminoguannidine ligands. The existence of covalent bonding ensures that if the modified polymeric shaped body of the invention comes into contact with blood or plasma, no diaminoguanidine and/or triaminoguannidine dissolves and comes into contact with tissue when the blood or plasma is introduced into the patient's body. Surprisingly, the diaminoguanidine and triaminoguannidine ligands show high reactivity with AGE precursors so that the latter can be rapidly removed from blood or plasma, whereby AGE formation can be markedly suppressed.

As R—X residues carried by the starting polymeric shaped body of the invention, any R—X with which diaminoguanidine or triaminoguanidine can enter into a nucleophilic substitution reaction is suitable in principle; the halomethyl groups —$CH_2$—Cl, —$CH_2$—Br, —$CH_2$—I and —$CH_2$—CH(OH)—$CH_2$Cl are preferred as the R—X residue, because the nucleophilic substitution reaction then proceeds rapidly.

As Y residues carried by the starting polymeric shaped body of the invention, any Y residues at which diaminoguanidine or triaminoguanidine can be added are suitable in principle; epoxides of formula

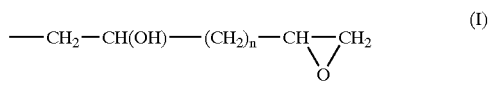

where n=1 to 10, or epoxides of formula

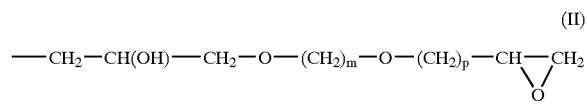

where m=1 to 4 and p=1 to 3 are preferred as residue Y because the addition then proceeds rapidly.

In contact with blood or plasma containing AGE precursors, the diaminoguanidine and/or triaminoguanidine ligands of the modified polymeric shaped body react with the AGE precursors with the formation of chemical bonds, so that the AGE precursors are irreversibly removed from the blood or plasma. For example, the α, β-dicarbonyl groups of the AGE precursors glyoxal, methylglyoxal and 3-deoxyglucosone react with the diaminoguanidine and/or triaminoguanidine ligands to form 1,2,4-triazines. On account of the high reactivity of the hydrazine groups present in the ligands the reaction is very fast and at room temperature is complete after only 10 to 15 minutes.

BRIEF DESCRIPTION OF THE DRAWINGS

Certain preferred embodiments of this invention will be described in detail, with reference to the following figures, in which.

DETAILED DESCRIPTION OF PREFERRED EMBODIMENTS

Figure 1:
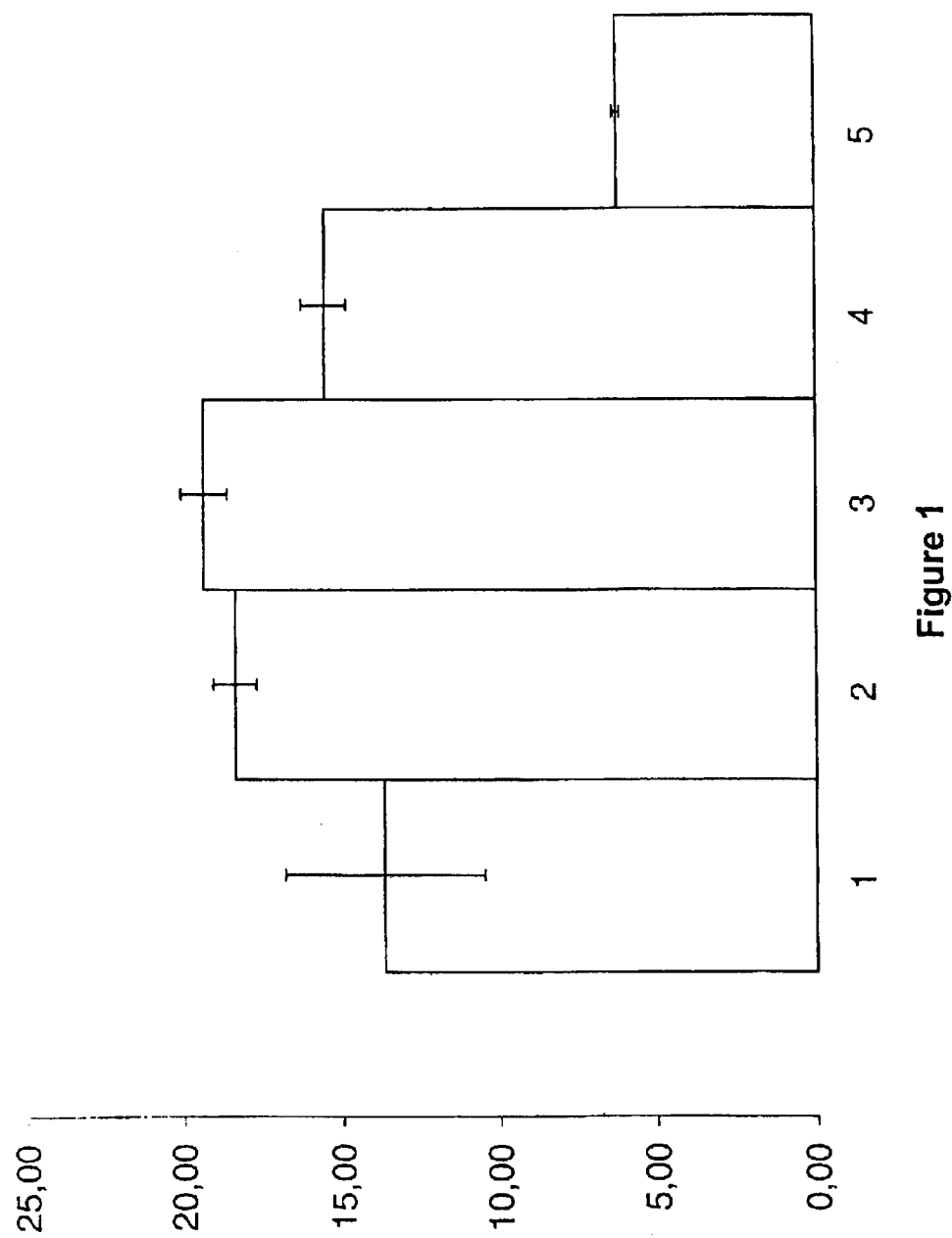
FIG. 1 is a histogram comparing the pentosidine concentrations in HD plasma after incubation with various membranes.

The modified polymeric shaped body of the invention is, e.g., a particulate material, preferably with a porous structure, with which an adsorber column can be filled, through which blood or plasma can be conducted. Through the particle size and porosity of the particulate material a large surface area can be made available for the reaction of the AGE precursors with the diaminoguanidine and/or triaminoguanidine ligands.

In a preferred embodiment of the invention, the modified polymeric shaped body is a semipermeable polymer membrane of porous structure, particularly a flat or hollow-fibre membrane, especially preferred polymer membranes being those that are sufficiently biocompatible in contact with plasma or blood.

The starting polymeric shaped body from which the modified polymeric shaped body of the invention can be produced can be a biopolymer, e.g., cellulose or a cellulosic polymer. However, the starting polymeric shaped body consists preferably of a synthetic polymer, because the chemical reactivity of a synthetic polymer is more easily controllable than that of, e.g., cellulose.

As the synthetic polymer, a polyamide is especially preferred. Polyamide-4,6, polyamide-6,6 and polyamide-6 are the most suitable.

A particularly preferred modified polymeric shaped body of the present invention can be produced from a starting polymeric shaped body consisting of a polyamide, where

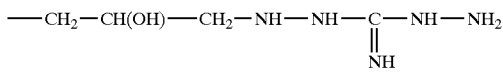

is bound to the amino end-groups of the polyamide.

Moreover, a polymer containing a sulfone group, such as polysulfone, polvethersulfone or polyarylethersulfone, is preferred as the starting polymeric shaped body. Especially preferred is polyethersulfone, i.e., a polymer with the repeating unit shown in formula (III).

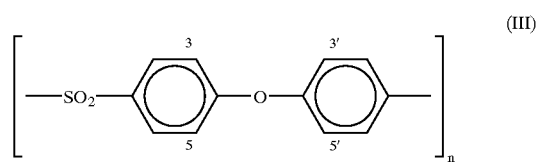

Polyethersulfones of this type are commercially available, e.g., under the brand name Ultrason® E (BASF). A commercially available polyethersulfone of this type is, e.g., Ultrason E 6020 P with a mean molecular weight $M_w$ of approx. 58,000 as determined by light scattering.

In a particularly preferred embodiment of the present invention, the shaped body of the invention consists of a polyethersulfone, where the group

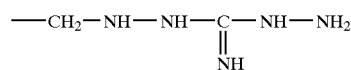

is bound to one or more of the 3, 3', 5 and 5' positions of the polyethersulfone.

The object is further achieved by a method for producing a modified polymeric shaped body comprising the steps
a) introduction into a polymer of R—X residues, where R is an alkylene group with 1 to 3 carbon atoms which may or may not be substituted with a hydroxyl group and X is a halogen atom, and production of a starting polymeric shaped body from the polymer containing the R—X residues, or introduction of R—X residues, where R—X has the same meaning as above, into a starting polymeric shaped body, or introduction of a residue Y, on to which diaminoguanidine and/or triarninoguanidine can be added, into a starting polymeric shaped body and
b) reaction of the starting polymeric shaped body containing the R—X residues or the residue Y with diaminoguanidine and/or triaminoguanidine, to obtain the modified polymeric shaped body.

An epoxide of formula

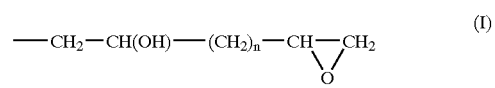

where n=1 to 10, or an epoxide of formula

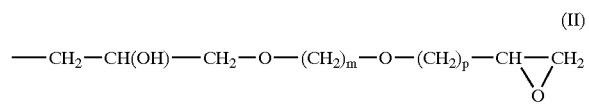

where m 1 to 4 and p=1 to 3 is preferably introduced as residue Y.

The reaction of the starting polymeric shaped body with diaminoguanidine and/or triaminoguanidine results in a modified polymeric shaped body, which carries diaminoguanidine and/or triaminoguanidine ligands on its surface. If the starting polymeric shaped body is a non-porous material, only the outer surface is provided with ligands. If on the other hand the starting polymeric shaped body is a porous material, preferably a microporous material, then the inner surface formed by the pores is available in addition to the outer surface. This gives rise to a high density of ligands and therefore to a high capacity for binding of AGE precursors.

In a preferred embodiment of the method of the invention, a semipermeable polymer membrane of porous structure is produced or used as the starting polymeric shaped body.

In the context of the method of the invention, a suitable polymer is in principle any biocompatible polymer into which the R—X residues can be introduced. Any biocompatible starting polymeric shaped body into which the R—X or Y residues can be introduced is a suitable starting polymeric shaped body for the invention. For example, the polymer or starting polymeric shaped body can consist of a biopolymer such as cellulose or a cellulosic polymer.

However, the polymer used in step a) of the method of the invention is preferably a synthetic polymer, and the starting polymeric shaped body is preferably a starting shaped body made from a synthetic polymer, because the chemical reactivity of synthetic polymers is more easily controlled than that of, e.g., cellulose.

In an especially preferred embodiment of the method of the invention, the synthetic polymer is polyethersulfone, i.e., a polymer with the repeating unit shown in formula (III). A polyethersulfone of this type is, e.g., Ultrason E 6020 P (BASF) with a mean molecular weight $M_w$, as determined by light scattering, of approx. 58,000. Also preferred as synthetic polymers are other polymers containing sulfone groups such as polysulfone or polyarylethersulfone.

In particular, an embodiment of the method of the invention is preferred whereby in step a) polyethersulfone is chloromethylated, bromomethylated or iodomethylated and the product used to produce a chloromethylated, bromomethylated or iodomethylated polyethersulfone shaped starting body, which is reacted in step b) with diaminoguanidine. A particularly suitable method for chloromethylation, bromomethylation or iodomethylation of polyethersulfone is described in, e.g., DE-A 100 12 332.

Most preferably, the polyethersulfone is chloromethylated, bromomethylated or iodomethylated in step a), and the product is used to produce a chloromethylated, bromomethylated or iodomethylated polyethersulfone membrane which is reacted with diaminoguanidine in step b).

In yet another especially preferred embodiment of the method of the invention, the synthetic polymer is a polyamide. Polyamide-4,6, polyamide-6,6 and polyamide-6 are the most suitable.

In a particularly preferred embodiment of the method of the invention, a polyamide shaped starting body is used in step a) and reacted with epichlorohydrin, and is subsequently reacted in step b) with diaminoguanidine.

Most preferably, a polyamide membrane, as the polyamide shaped starting body, is reacted with epichlorohydrin in step a) and with diaminoguanidine in step b). The most suitable polyamide membrane for this purpose is a polyamide-6 membrane, as obtainable from Membrana GmbH under the type designation "micro PA 386c".

For step b) of the method of the invention, all reaction conditions are suitable in principle under which the nucleophilic aliphatic substitution of the halogen X in R—X by diaminoguanidine or triaminoguanidine, or the reaction of residue Y with diaminoguanidine and/or triaminoguanidine, is possible. In an especially preferred embodiment of the method of the invention, the reaction in step b) takes place in an alkaline aqueous solution, because diaminoguanidine and triaminoguanidine show the highest nucleophilicity under these conditions.

The temperature range for the reaction in step b) extends from above the freezing point to below the boiling point of the solution containing aminoguanidine and/or triaminoguanidine. In an especially preferred embodiment of the method of the invention, the reaction in step b) takes place in a temperature range from room temperature to approx. 80° C. If, for example, a reaction time of one hour is envisaged for the reaction with diaminoguanidine of a polyamide membrane that has been reacted with epichlorohydrin, a temperature of 80° C. is required, whereas room temperature is sufficient for reaction of a polyethersulfone membrane that has been produced from chloromethylated polyethersulfone.

The modified shaped bodies of the invention are advantageously used in methods for the removal of AGE precursors from blood or plasma. AGE precursors are reactive carbonyl compounds. The modified shaped bodies of the invention can therefore be successfully used for removal of reactive carbonyl compounds from blood, plasma or PBS buffer (8 g/l NaCl, 2.9 g $Na_2HP_4 \cdot 12H_2O$ and 0.2 g/l $Na_2HPO_4$, pH=7.4)

The modified polymeric shaped bodies of the invention are preferably used for removal of dicarbonyl compounds, and particularly of glyoxal, methylglyoxal, 3-deoxyglucosone, malonic dialdehyde, glycerol dialdehyde and 2-hydroxypropanal, which may occur either singly or as a mixture.

The modified polymeric shaped body of the invention is preferably used as a modified polymer membrane in a suitable housing. The membrane is, e.g., a hemodialysis membrane, so that the AGE precursors become chemically bound to the diaminoguanidine or triaminoguanidine ligands during hemodialysis and are thus removed from the blood. The modified polymer membrane can also be a microporous membrane mounted in an appropriate module, whereby the blood or plasma to be treated can be conducted through the membrane in dead-end mode or cross-flow mode, A module of this type can be used as an independent unit or in combination with, e.g., a hemodialyzer.

The separation of AGE precursors from blood, plasma or PBS buffer that is possible using the modified shaped body of the invention is based on a chemical reaction of the AGE precursors with the diaminoguanidine and/or triaminoguanidine ligands, and is therefore independent of the size of the AGE precursor. This means that the modified shaped body of the invention can remove from plasma or blood even large AGE precursors that cannot be removed by dialysis.

EXAMPLES

The invention will now be described in more detail with the help of the following examples.

Example 1

Modified Polymer Membrane Produced from a Polyamide Capillary Membrane, Epichlorohydrin and Diaminoguanidine 2 g of a polyamide capillary membrane ("micro PA 386 c" from Membrana GmbH) are placed in a tube with a bottom inlet. To bring about the chlorine-carbon bonding in the membrane, epichlorohydrin is used as a 5% by weight solution in a solvent consisting of equal parts by weight of water and isopropanol. Diaminoguanidine (DAG) is used as a 5% by weight aqueous solution that contains NaOH in a quantity equimolar with respect to DAG. The modification of the polyamide capillary membrane is carried out in accordance with the following table showing agent, time, temperature and volume. As each step in the table is completed, the corresponding medium is decanted off.

| Agent | Time [min] | Temperature [° C.] | Volume [ml] |
|---|---|---|---|
| H₂O/i-propanol to wet the membrane | 10 | 50 | 200 |
| H₂O to wash the membrane | 10 | 50 | 200 |
| H₂O to wash the membrane | 10 | 100 | 200 |
| Epichlorohydrin/H₂O/i-propanol solution for epoxidation of the amino end-groups of the membrane and formation of the Cl—C bond | 60 | 50 | 200 |
| H₂O to wash the membrane | 10 | 50 | 200 |
| DAG/NaOH/H₂O solution for bonding of DAG to the membrane | 60 | 80 | 100 |
| H₂O to wash the modified membrane   3 x | (15 | 50 | 300) |

The modified membrane is air-dried to constant weight. Sterile storage is possible, e.g., under 70% ethanol. As proof that the DAG is covalently bound to the membrane, the —NH$_{12}$— group content of the diaminoguanidine is determined using the ninhydrin reaction.

Example 2

Modified Polymer Membrane Produced from a Chloromethylated Polyethersulfone Flat Membrane and Diaminoguanidine Polyethersulfone was chloromethylated as described in DE-A 100 12 332 with a degree of substitution of 0.03. The degree of substitution is defined here as the quotient of the total number of chloromethyl groups in the chloromethylated polyethersulfone and the total number of repeating units of the polyethersulfone.

A solution containing 8 g of the chloromethylated polyethersulfone, 36 g of dimethylacetamide and 9.6 g of polyethylene glycol (PEG 200) is blade coated to a film of wet-film thickness of 75 µm, coagulated with steam at the surface, precipitated in water, washed and dried. The chloromethylated polyethersulfone flat membrane is placed in a dish positioned on a shaker board and reacted with diaminoguanidine (DAG) at room temperature in accordance with the following table showing agent, time and volume. The DAG is used as an aqueous solution containing 5% by weight of DAG and an equimolar quantity of NaOH. As each step in the table is completed, the corresponding medium is decanted off.

| Agent | Time [min] | Volume [ml] |
|---|---|---|
| H₂O/i-propanol to wet the membrane | 10 | 100 |
| H₂O to wash the membrane | 10 | 100 |
| DAG/NaOH/H₂O solution for bonding of DAG to the membrane | 60 | 100 |
| H₂O to wash the membrane   3 x Acidify to pH 2 with HCl | [10 | 200] |
| Neutral wash the membrane with H₂O   3 x | [10 | 200] |

The membrane is air-dried to constant weight.

Example 3

Inhibition of Pentosidine Formation in HID Plasma Using a DAG-modified Polymer Membrane Polyethersulfone was chloromethylated as described in DE-A 110 12 332 with a degree of substitution of 0. 17. A flat membrane was produced from the chloromethylated polyethersulfone as described in example 2 and was reacted with DAG.

The 12-day incubations at 37° C. described below are carried out in Eppendorf caps. The modified membrane is incubated with HD plasma (plasma from hemodialysis patients before dialysis) and the concentration of the AGE pentosidine is then measured. The area of the modified membrane used in this experiment is determined such that 5 mol of DAG are available per ml of HD plasma.

The pentosidine concentrations are determined as described in Kidney International, vol 55 (1999), pp 2487–2492. The results are shown in the histogram of FIG. 1, where the pentosidine concentrations are given in relative units (RU). Bar 5 of FIG. 1 shows the initial concentration of pentosidine in the HD plasma, which is approx. 6.3 RU. Bar 3 of FIG. 1 shows the pentosidine concentration after incubation of the HD plasma. It is seen that the AGE precursors present in the HD plasma lead to an increase in the AGE pentosidine to approx. 19.3 RU, so that approx. 13 RU of pentosidine are formed during the incubation. As bar 2 of FIG. 1 shows, approximately the same amount of pentosidine is formed during incubation of the unmodified polyethersulfonc membrane. Bar 1 of FIG. 1 represents the pentosidine concentration that is measured after incubation with the modified membrane. If the 13 RU of pentosidine formed in the absence of the membrane is taken to be 100%, the 7.4 RU of pentosidine formed when the modified membrane is used indicate that with the modified membrane only about 57% of the pentosidine is formed. The modified membrane thus leads to a suppression of pentosidine formation by approx. 43%. Bar 4 shows the pentosidine concentration after incubation of the HD plasma with 5 µmol of aminoguanidine per ml of HD plasma. In view of the indicated error limits, the resulting pentosidine concentration is about the same as with the modified polymer membrane, so that, relative to the same number of reactive groups, covalent bonding of the DAG, as compared with free aminoguanidine, does not reduce inhibition of pentosidine formation.

Example 4

Inhibition of Pentosidine Formation in Dialysed LID Plasma with a DAG-modified Polymer Membrane Example 3 was repeated with the difference that an HD plasma was used which had been dialysed 3 times for 8 hours against regenerated cellulose with an exclusion limit of 3500 Dalton.

Figure 2:
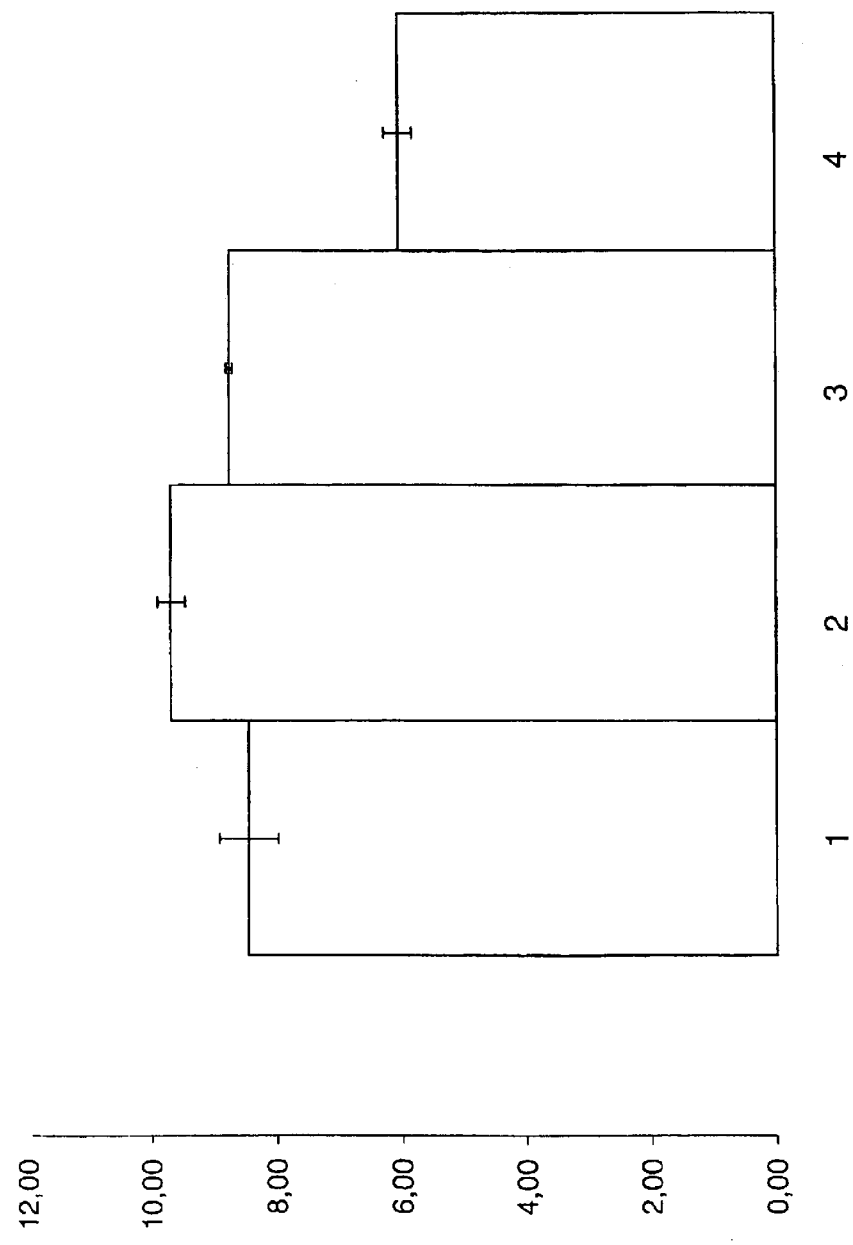
FIG. 2 is a histogram showing the pentosidine concentrations in HD plasma that was dialyzed 3 times for 8 hours against regenerated cellulose with an exclusion limit of 3500 Dalton after incubation with various membranes.

The results are shown in the histogram of FIG. 2. Bar 4 of this figure shows the initial concentration of pentosidine in the HD plasma, which is approx. 6 RU.

Bar 2 of FIG. 1 shows the pentosidine concentration after incubation of the HD plasma without the modified membrane. It is seen that the AGE precursors present in the HD plasma lead to an increase in the AGE pentosidine to approx. 9.6 RU, so that approx. 3.6 RU of pentosidine are formed during the incubation. Bar 1 of FIG. 2 shows the pentosidine concentration that is measured after incubation with the modified membrane. If the 3.6 RU of pentosidine formed in the absence of the membrane is taken to be 100%, the 2.4 RU of pentosidine formed when the modified membrane is used indicate that with the modified membrane only about 66% of the pentosidine is formed. The modified membrane thus leads to a suppression of pentosidine formation by approx. 34%. Bar 3 of FIG. 2 shows the pentosidine concentration after incubation of the HD plasma with 5 μmol of aminoguanidine per ml of HD plasma. In view of the indicated error limits, the resulting pentosidine concentration is about the same as with the modified polymer membrane.

Example 5

Binding of Methylglyoxal from PBS Buffer to a DAG-modified Polymer Membrane 1 ml of PBS buffer of pH 7.4 (Sigma) containing inter al. the AGE precursor methylglyoxal (MGO) in a concentration of 1 nM, is brought into contact in Eppendorf caps with a polyethersulfone flat membrane that has been chloromethylated and reacted with diaminoguanidine (DAG) according to example 3. The area of the modified membrane is determined such that 1 μmol of NH2—NH — groups of the DAG is in contact with the PBS buffer containing MGO.

After 4 hours on a shaker board at room temperature, the MGO concentration in the PBS buffer is determined by the following method. 100μl of PBS buffer containing MGO, 10 μl of 2,3-butanedione solution as internal standard, 80 μof perchloric acid (2M) and 40 μl of o-phenylenediamine solution (1%) are mixed and reacted for 1 hour in the dark at room temperature. The dicarbonyl compound MGO reacts with the o-phenylenediamine to give the corresponding quinoxaline derivative. The PBS buffer also contains 1 nM each of the AGE precursors glyoxal and 3-deoxyglucosone, which when reacted with o-phenylenediamine are converted into the corresponding quinoxaline derivatives.

The resulting quinoxaline derivatives can be separated by HPLC and detected by means of a UV detector at 315 nm. The peak appearing after 19.7 minutes is assigned to MGO. The column material is "Puresil" from Waters (C18, 120 Å, 4.6×250 mm). The column is operated with a flow of 1 m/min. The PBS buffer containing the derivatised AGE precursors is injected. Solutions A (0.1% of trifluoroacetic acid in water) and B (0.08% trifluoroacetic acid in 80% aqueous acetonitrile solution) are then employed in the concentration time program shown below.

| Time [min] | Concentration of Solution B (the difference from 100% is Solution A) |
|---|---|
| 0 | 15% |
| 0–25 | 15–28%, increasing linearly |
| 25–27 | 100% |

Figure 3:
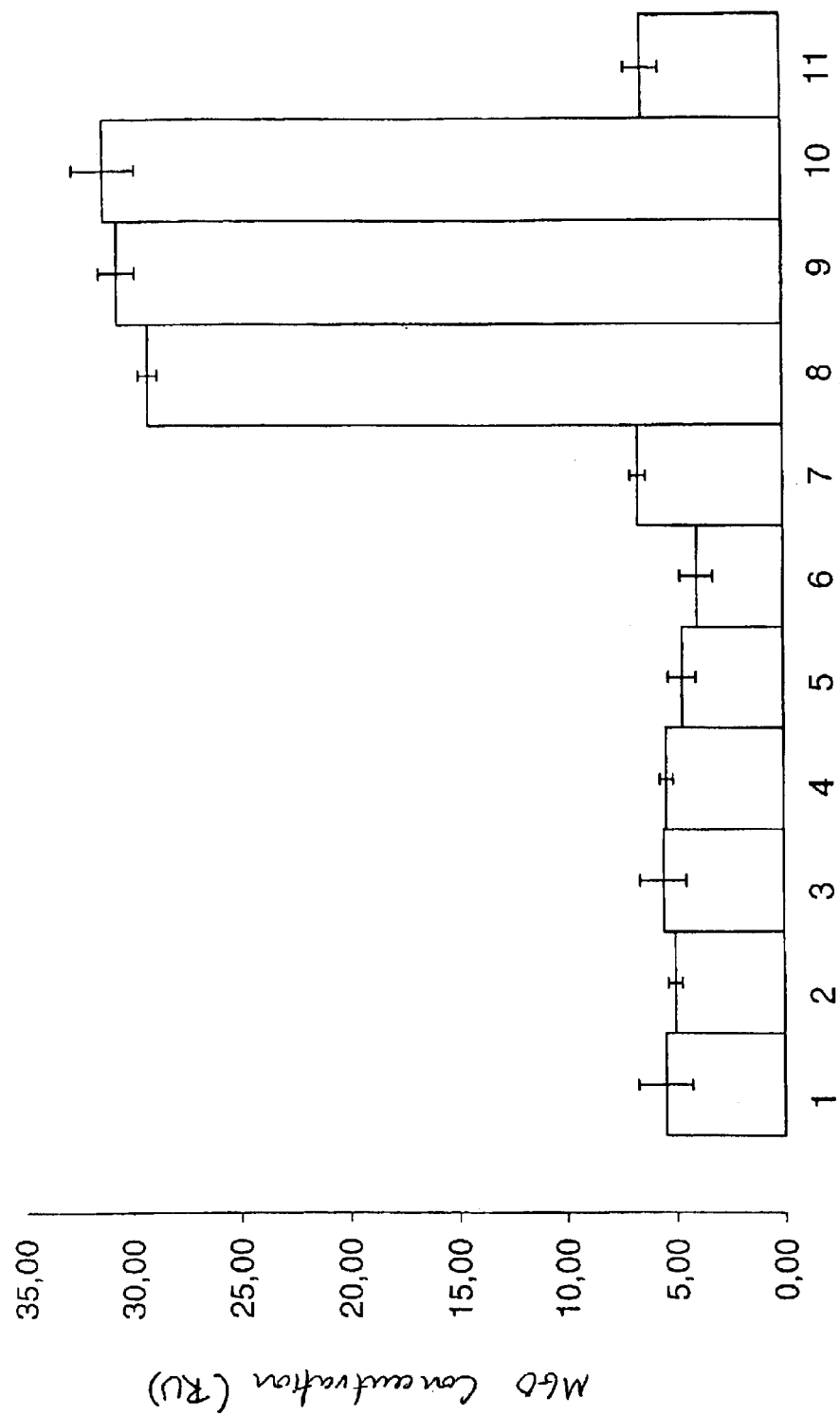
FIG. 3 is a histogram showing the MGO concentrations in the PBS buffer that contained a modified polymer membrane.

The results are shown in FIG. 3, where the MGO concentration is expressed in relative units (RU). Bars 1–7 of FIG. 3 show the MGO concentrations in the PBS buffer that contained the modified polymer membrane. The modified polymer membranes were brought into the HCl form after their production (bars 1 and 2 of FIG. 3), used as free base (bars 3 and 4 of FIG. 3), brought into the HCl form and stored in water (bar 5 of FIG. 3), stored in aqueous NaN$_3$ solution (bar 6 of FIG. 3) and stored as free base in water (bar 7 of FIG. 3), and then brought into contact with the PBS buffer containing MGO. Bars 1–7 of FIG. 3 show that after a period of contact of 4 hours with the PBS buffer containing AGEs, and irrespective of the form in which the modified polymer membrane was used, the MGO concentration in the PBS buffer, at approx. 5 RU, is only about one sixth of the MGO concentration measured in the PBS buffer containing a polyethersulfone membrane that had only been chloromethylated (bar 8 in FIG. 3) and a polyethersulfone membrane that had been stored dry before the experiment (bar 9 in FIG. 3). About the same quantity of MGO is found in the PBS buffer without a membrane (bar 10 of FIG. 3), while a PBS buffer containing 1 μmol of aminoguanidine hydrochloride (bar 11 of FIG. 3) shows approximately the same MGO concentration as found in the PBS buffer with the modified polymer membranes.

Example 6

Bonding of AGE Precursors from HD plasma with a DAG-modified Polymeric Membrane

Example 5 was repeated with the difference that, in place of PBS buffer, HD plasma was used that contained, inter al., the AGE precursors methylglyoxal (MGO), glyoxal (GO) and a reactive dicarbonyl compound, of which the quinoxaline derivative was detected after 14.3 minutes using the HPLC method described in example 5. The area of the modified membrane is so determined that 10 mol of NH2—NH— groups of the DAG are in contact with the HD plasma In order to determine the AGE precursors the proteins must first be removed from the HD plasma. For this purpose, 200 μl of the HD plasma are diluted with 200 μl of (superpure) water in an Eppendorf cap. 100 μl of 2M HCIO$_4$ are then added, which causes the proteins to precipitate. To induce the precipitate to settle, the mixture is centrifuged for 3 min at 12,000 rpm and then through a 0.45 μm filter for 3 min at 5,000 rpm. After addition of 5 μl of 2,3-butanedione as internal standard and 20 μl of a 1% solution of o-phenylenediamine, the mixture is allowed to react for 1 hour at room temperature, as a result of which the AGE precursors are converted into their quinoxaline derivatives. These are separated by HPLC as described in example 5.

Figure 4:
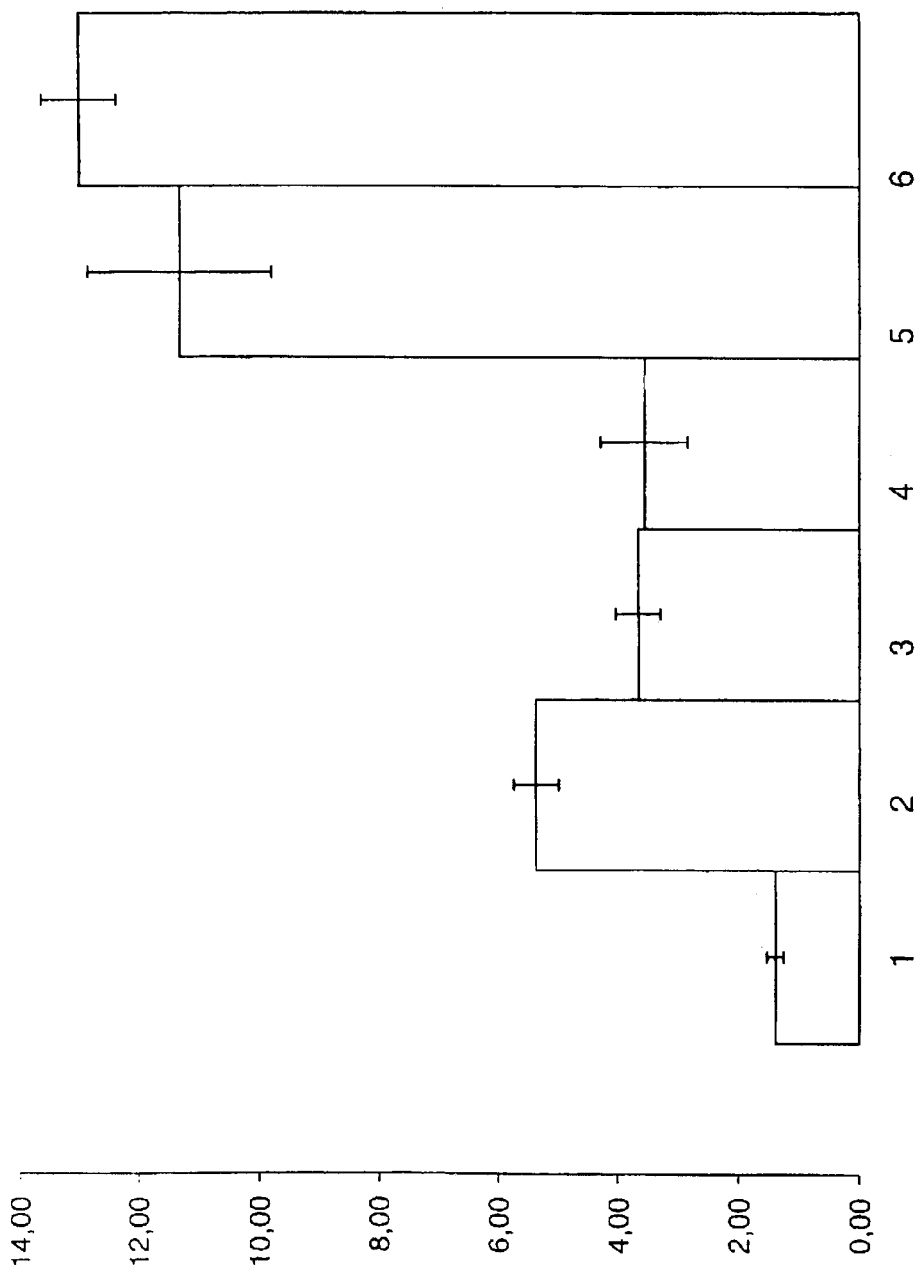
FIG. 4 shows the MGO concentration measured after 4 hours of contact between a modified polymeric membrane and HD plasma.

The results for MGO are shown in FIG. 4. Bar 2 of FIG. 4 shows the MGO concentration in relative units (RU) that was measured after 4 hours of contact between the modified polymeric membrane and the HD plasma. In comparison with the MGO concentration that was measured in the HD plasma without the membrane (bar 6 of FIG. 4), the MGO concentration after 4 hours of contact with the modified polymeric membrane is only approx. 42%. Bars 3, 4 and 5 of FIG. 4 show the MGO concentrations that were obtained after 4 hours of contact with HD plasma containing 20, 5 and 1 mol of aminoguanidine hydrochloride per ml of HD plasma. Bar 1 of FIG. 4 shows the MGO concentration in HD plasma that had been dialysed 3 times for 8 hours against regenerated cellulose with an exclusion limit of 3,500 Dalton. In view of its size, MGO should therefore be capable of being completely removed, but approx. 1.5 RU of MGO are still present in the HD plasma after the dialysis.

Figure 5:
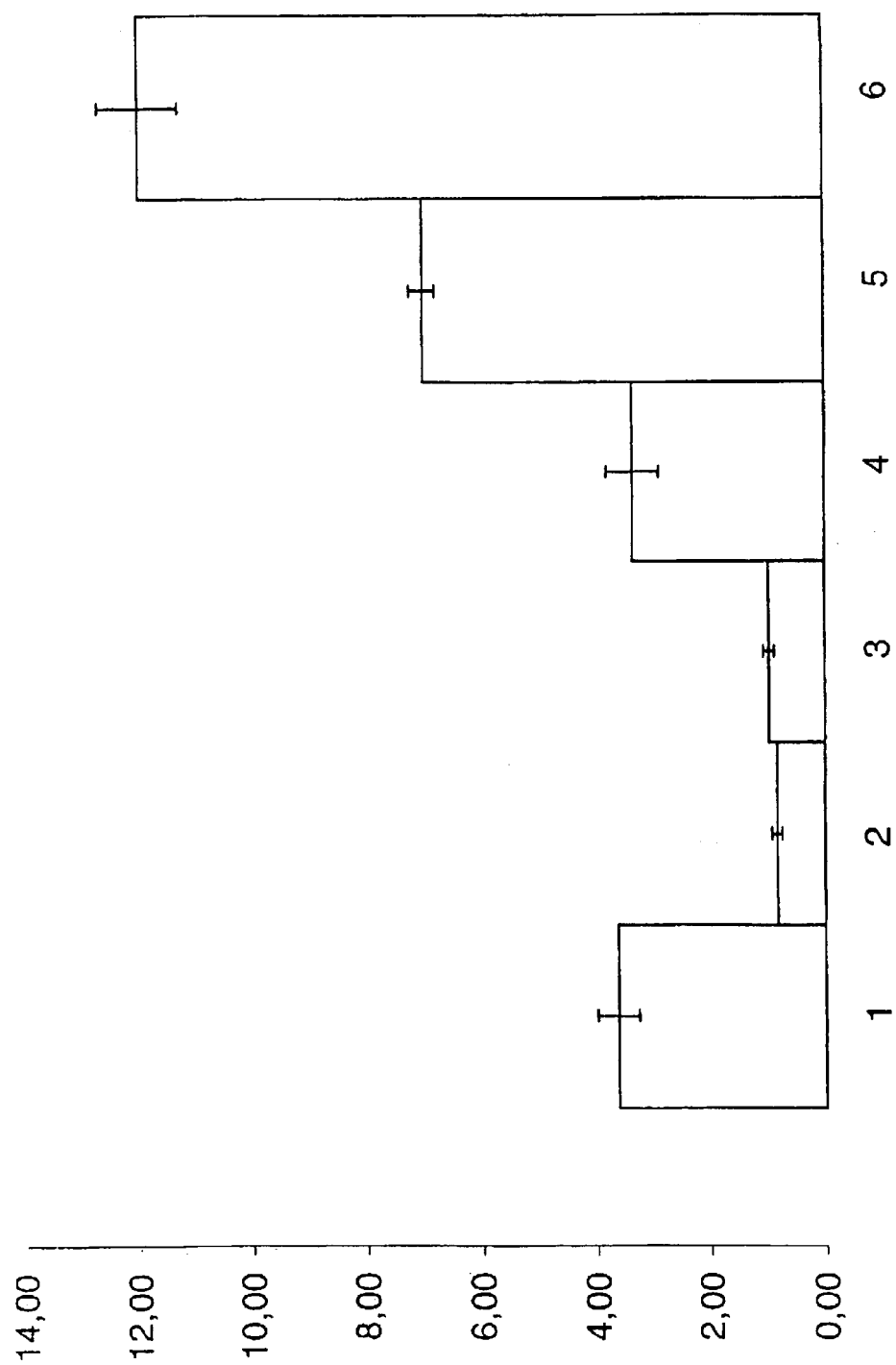
FIG. 5 shows the concentration of reactive dicarbonyl compounds measured after 4 hours of contact between a modified polymeric membrane and HD plasma.

The results for the reactive dicarbonyl compound detected in the HPLC after 14.3 minutes are shown in FIG. 5. Bar 2 of FIG. 5 shows the concentration in relative units (RU) of reactive dicarbonyl measured after 4 hours of contact between the modified polymer membrane and the HD plasma. In comparison with the reactive dicarbonyl concentration that was measured in the HD plasma without the modified polymer membrane (bar 6 of FIG. 5), the reactive dicarbonyl concentration is only approx. 7%. Bars 3, 4 and 5 of FIG. 5 show the residual concentrations of were measured after 4 hours of contact with an HD plasma to which 20, 5 and 1 μmol of aminoguanidine hydrochloride per ml of HD-Plasma had been added. Bar 1 of FIG. 5 shows the concentration of the reactive dicarbonyl that had previously been dialysed 3 times for 8 hours against regenerated cellulose with an exclusion limit of 3,500 Dalton. Comparison of bar 1 with bar 2 in FIG. 5 shows that the modified polymeric membrane is appreciably more efficient than dialysis in removing reactive dicarbonyl present in HD plasma.

Figure 6:
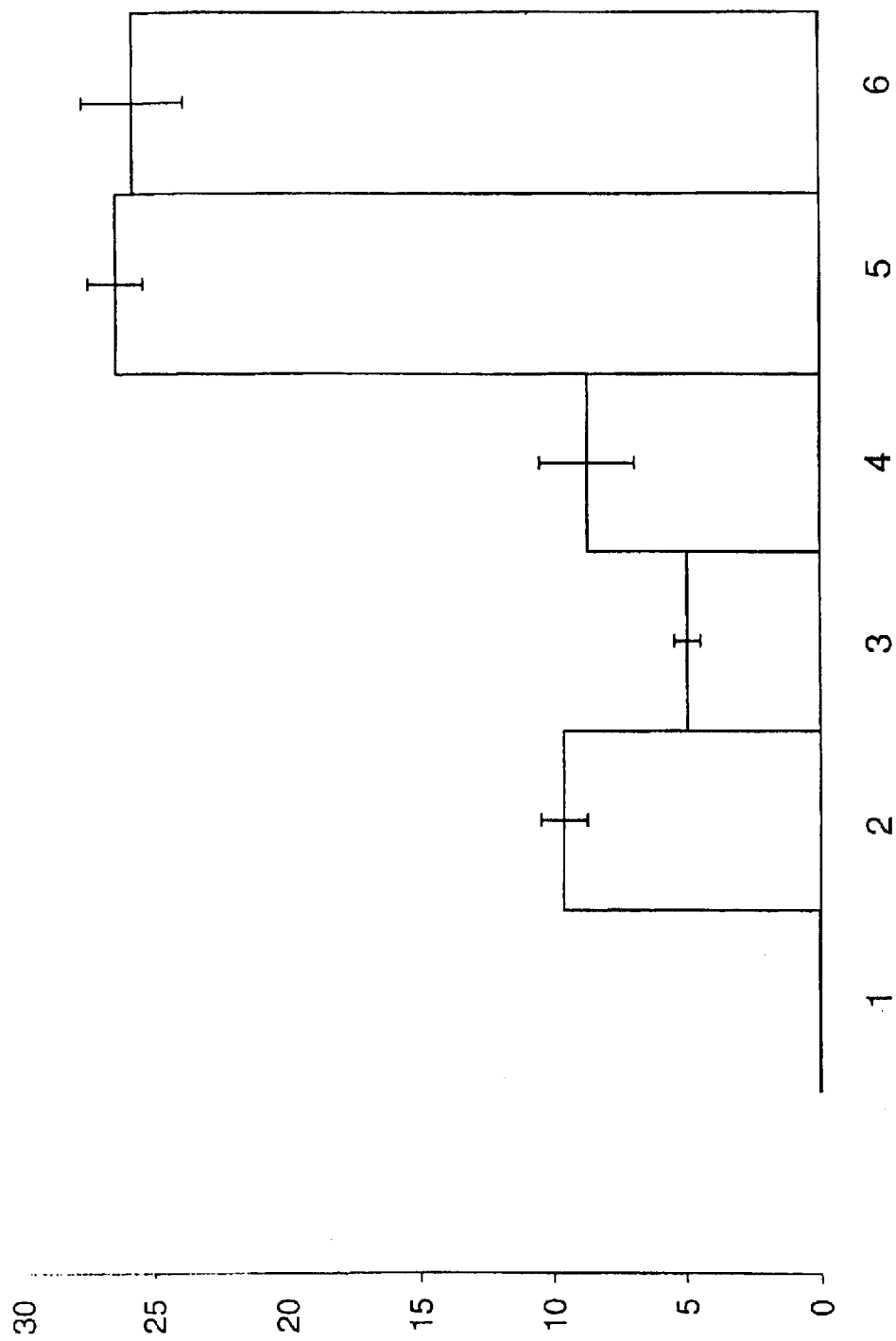
FIG. 6 shows the GO concentration measured after 4 hours of contact between a modified polymeric membrane and HD plasma.

The results for GO are shown in FIG. 6. Bar 2 of FIG. 6 shows the GO concentration in relative units (RU) that was measured after 4 hours of contact between the modified polymer membrane and the HD plasma. In comparison with the GO concentrations measured in the HD plasma without the modified polymer membrane (bar 6 of FIG. 6), the GO concentration is only approx. 37%. Bars 3, 4 and 5 of FIG. 6 show the GO concentrations that were obtained after 4 hours of contact with HD plasma containing 20, 5 and 1 μmol of aminoguanidine hydrochloride per ml of HD plasma. Bar 1 of FIG. 6 shows the GO concentration in HD plasma that had previously been dialysed 3 times for 8 hours against regenerated cellulose with an exclusion limit of 3,500 Dalton. The small GO molecule was completely removed by dialysis.

What is claimed is:

1. A modified polymeric shaped body produced by reacting at least one of diaminoguanidine or triaminoguanidine with a starting polymeric shaped body carrying R—X residues, where R is an alkylene group that may be substituted with a hydroxyl group and contains from 1 to 3 carbon atoms, and X is a group that is substituted during the reaction by at least one of dianinoguanidine, or triaminoguanidine, or with a starting polymeric shaped body carrying residues Y, on to which at least one of diaminoguanidine or triaminoguanidine are added during the reaction.

2. The modified polymeric shaped body according to claim 1, characterized in that the R—X residues are the halomethyl groups —CH$_2$Cl, —CH$_2$Br, —CH$_2$I or —CH$_2$—CH(OH)—CH$_2$Cl.

3. The modified polymeric shaped body according to claim 1, characterized in that the residues Y are epoxides of formula (I)

$$—CH_2—CH(OH)—(CH_2)_n—CH\underset{O}{\overset{}{\diagdown\!\!\!\diagup}}CH_2 \quad (I)$$

where n=1 to 10, or epoxides of formula (II)

$$—CH_2—CH(OH)—CH_2—O—(CH_2)_m—O—(CH_2)_p—CH\underset{O}{\overset{}{\diagdown\!\!\!\diagup}}CH_2 \quad (II)$$

where m=1 to 4 and p=1 to 3.

4. The modified polymeric shaped body according to claim 1, characterized in that it is a polymer membrane.

5. The modified polymeric shaped body according to claim 1, characterized in that the starting polymeric shaped body consists of a synthetic polymer.

6. The modified polymeric shaped body according to claim 5, characterized in that the synthetic polymer is a polyamide.

7. The modified polymeric shaped body according to claim 6, characterized in that the starting polymeric shaped body is a polyamide having amino end-groups to which $$—CH_2—CH(OH)—CH_2—NH—NH—\underset{NH}{\overset{}{\overset{\|}{C}}}—NH—NH_2$$

is bound.

8. The modified polymeric shaped body according to claim 5, characterized in that the starting polymeric shaped body is a polyethersulfone.

9. The modified polymeric shaped body according to claim 8, characterized in that $$—CH_2—NH—NH—\underset{NH}{\overset{}{\overset{\|}{C}}}—NH—NH_2$$

is bound at one or more of the 3, 3', 5 and 5' positions of the polyethersulfone.

10. A method for removing reactive carbonyl compounds from blood, plasma or PBS buffer comprising incubating the modified polymeric shaped body according to claim 1 with blood, plasma or PBS buffer.

11. The method according to claim 10, characterized in that the reactive carbonyl compounds are dicarbonyl compounds.

12. The method according to claim 11, characterized in that the dicarbonyl compounds are glyoxal, methylglyoxal, 3-deoxyglucosone, malonic dialdehyde, glycol dialdehyde and 2-hydroxypropanal, which may occur singly or as a mixture.

13. The method according to claim 10, characterized in that the modified polymeric shaped body is a modified polymeric membrane.

14. A method for producing a modified polymeric shaped body comprising:
  a) forming a starting polymeric shaped body
  b) introducing into the starting polymeric shaped body a residue selected from the group consisting of an R—X residue and a Y residue; and
  c) reacting the starting polymeric shaped body containing the R—X residues or the residue Y with at least one of diaminoguanidine or triaminoguanidine to obtain the modified polymeric shaped body,
  wherein, R is an alkylene group that may be substituted with a hydroxyl group and contains from 1 to 3 carbon atoms, X is a halogen atom and Y is a residue to which diaminoguanidine or triaminoguanidine can be added.

15. The method according to claim 14, characterized in that a semipermeable polymer membrane of porous structure is produced or used as the starting polymeric shaped body.

16. The method according to claim 14, characterized in that in step a) a synthetic polymer is used as the polymer, or a shaped starting body made from a synthetic polymer as the starting polymeric shaped body.

17. The method according to claim 16, characterized in that in step a) the synthetic polymer is a polyethersulfone.

18. The method according to claim 17, characterized in that in step a) the polyethersulfone is chloromethylated, bromomethylated or iodomethylated and a chloromethylated, bromomethylated or iodomethylated polyethersulfone shaped starting body is produced therefrom, which is reacted in step c) with diaminoguanidine.

19. The method according to claim 16, characterized in that the synthetic polymer is a polyamide.

20. The method according to claim 19, characterized in that in step a) a polyamide shaped starting body is used and is reacted with epichlorohydrin and subsequently, in step c), with diaminoguanidine.

21. The method according to claim 14, characterized in that the reaction in step c) takes place in an alkaline aqueous solution.

22. The method according to claim 14, characterized in that the reaction in step c) takes place in a temperature range from room temperature to approx. 80° C.

23. A method for producing a modified polymeric shaped body comprising:
   a) producing a starting polymeric shaped body from a polymer containing R—X residues; and
   b) reacting the starting polymeric shaped body containing the R—X residues or the residue Y with at least one of diaminoguanidine or triaminoguanidine to obtain the modified polymeric shaped body,
   wherein, R is an alkylene group that may be substituted with a hydroxyl group and contains from 1 to 3 carbon atoms, X is a halogen atom and Y is a residue to which diaminoguanidine or triaminoguanidine can be added.

24. The method according to claim 23, characterized in that a semipermeable polymer membrane of porous structure is produced or used as the starting polymeric shaped body.

25. The method according to claim 23, characterized in that in step a) a synthetic polymer is used as the polymer, or a shaped starting body made from a synthetic polymer as the starting polymeric shaped body.

26. The method according to claim 25, characterized in that in step a) the synthetic polymer is a polyethersulfone.

27. The method according to claim 26, characterized in that in step a) the polyethersulfone is chloromethylated, bromomethylated or iodomethylated and a chloromethylated, bromomethylated or iodomethylated polyethersulfone shaped starting body is produced therefrom, which is reacted in step b) with diaminoguanidine.

28. The method according to claim 27, characterized in that the synthetic polymer is a polyamide.

29. The method according to claim 27, characterized in that in step a) a polyamide shaped starting body is used and is reacted with epichlorohydrin and subsequently, in step b), with diaminoguanidine.

30. The method according to claim 23, characterized in that the reaction in step b) takes place in an alkaline aqueous solution.

31. The method according to claim 23, characterized in that the reaction in step b) takes place in a temperature range from room temperature to approx. 80° C.

* * * * *

UNITED STATES PATENT AND TRADEMARK OFFICE
CERTIFICATE OF CORRECTION

PATENT NO.    : 6,946,527 B2
DATED         : September 20, 2005
INVENTOR(S)   : Horst Dieter Lemke and Arne Gehlen It is certified that error appears in the above-identified patent and that said Letters Patent is hereby corrected as shown below:

Title page,
Item [57], ABSTRACT,
Lines 3-4, "triaminoguannidine" should be -- triaminoguanidine --.
Line 4, "staring" should be -- starting --.
Line 8, delete "carrying residues Y, on to with".
Line 9, after "diaminoguanidine" insert -- and/or triaminoguanidine --.
Line 9, after "body", insert -- carrying residues Y, on to --.
Line 10, delete "during the reaction".
Lines 10-11, "triaminoguannidine" should be -- triaminoguanidine --.

Column 1,
Line 55, "3-deoxglueosone" should be -- 3-deoxglucosone --.

Column 2,
Lines 1, 6, 8-9, 11, 15, 18-19 and 21-22, "triaminoguannidine" should be
-- triaminoguanidine --.

Column 3,
Line 64, "polvethersulfone" should be -- polyethersulfone --.

Column 4,
Line 33, "triarninoguanidine" should be -- triaminoguanidine --.

Column 5,
Line 27, "shapcd" should be -- shaped --.

Column 6,
Line 15, "g" should be -- g/l --.
Line 28, "diaminoguanidinc" should be -- diaminoguanidine --.
Line 29, "arc" should be -- are --.
Line 33, "mode," should be -- mode. --.
Lines 39-40, "triaminoguanidinc" should be -- triaminoguandine --.

Column 7,
Line 66, "DE-A 110 12 332" should be -- DE-A 100 12 332 --.

Column 8,
Line 25, "polyethersulfonc" should be -- polyethersulfone --.
Line 45, "LID" should be -- HD --.

UNITED STATES PATENT AND TRADEMARK OFFICE
CERTIFICATE OF CORRECTION

PATENT NO. : 6,946,527 B2
DATED : September 20, 2005
INVENTOR(S) : Horst Dieter Lemke and Arne Gehlen It is certified that error appears in the above-identified patent and that said Letters Patent is hereby corrected as shown below:

<u>Column 9,</u>
Line 14, "nM" should be -- mM --.
Line 23, "$\mu$of" should be -- $\mu$l of --.

<u>Column 10,</u>
Line 27, "HCIO$_4$" should be -- HC1O$_4$ --.
Line 47, "mol" should be -- $\mu$mol --.

Signed and Sealed this

Thirteenth Day of December, 2005

JON W. DUDAS
*Director of the United States Patent and Trademark Office*